United States Patent
Gunderson et al.

(10) Patent No.: US 7,064,913 B2
(45) Date of Patent: Jun. 20, 2006

(54) ENHANCED READ MARGINING USING DITHER ENHANCED WRITE MARGINALIZATION FOR MASS DATA STORAGE APPLICATIONS

(75) Inventors: Dan Gunderson, Westminster, CO (US); Doug Gunther, Westminster, CO (US)

(73) Assignee: Quantum Corporation, San Jose, CA (US)

( * ) Notice: Subject to any disclaimer, the term of this patent is extended or adjusted under 35 U.S.C. 154(b) by 543 days.

(21) Appl. No.: 10/043,597

(22) Filed: Jan. 9, 2002

(65) Prior Publication Data

US 2003/0128448 A1    Jul. 10, 2003

(51) Int. Cl.
*G11B 27/36*     (2006.01)

(52) U.S. Cl. .................. 360/31; 360/77.17; 360/78.02; 360/78.03; 360/72.3; 360/77.12; 360/77.04; 360/77.03; 360/53; 360/63; 360/75

(58) Field of Classification Search .................. 360/46, 360/65, 51, 53, 32, 15, 25, 91.92, 69, 76, 360/77.16, 77.17, 64, 31, 71, 74.1, 72.2, 360/35, 91, 92–93; 324/210, 212; 369/44.13, 369/43
See application file for complete search history.

(56) References Cited

U.S. PATENT DOCUMENTS

| | | | | |
|---|---|---|---|---|
| 4,404,605 A | * | 9/1983 | Sakamoto | 360/77.17 |
| 4,760,471 A | * | 7/1988 | Brush et al. | 386/78 |
| 4,794,467 A | | 12/1988 | Okuyama et al. | 360/15 |
| 4,935,827 A | * | 6/1990 | Oldershaw et al. | 360/7.16 |
| 5,157,563 A | * | 10/1992 | Nagasawa et al. | 360/77.16 |
| 5,233,487 A | * | 8/1993 | Christensen et al. | 360/77.04 |
| 5,347,407 A | * | 9/1994 | Solhjell et al. | 360/53 |
| 5,585,974 A | * | 12/1996 | Shrinkle | 360/46 |
| 5,786,951 A | | 7/1998 | Welland et al. | 360/46 |
| 5,982,718 A | | 11/1999 | Takiguchi | 369/124.1 |
| 6,233,109 B1 | * | 5/2001 | Melbye | 360/63 |

FOREIGN PATENT DOCUMENTS

EP    1 059 630 A1    12/2000

* cited by examiner

*Primary Examiner*—David Hudspeth
*Assistant Examiner*—Natalia Figueroa
(74) *Attorney, Agent, or Firm*—Michael Zarrabian

(57) ABSTRACT

A recording target error rate is selected for one or more of data storage devices, and for each data storage device, a dither value is determined for each read/write head in the data storage device, wherein for each head, using a dither value for writing data, essentially provides the selected recording target error for all the heads.

34 Claims, 4 Drawing Sheets

ENHANCED READ MARGINING USING DITHER ENHANCED WRITE MARGINALIZATION FOR MASS DATA STORAGE APPLICATIONS

FIELD OF THE INVENTION

The present invention relates to data storage. More particularly, the present invention relates to reliable data storage in removable media data storage devices.

BACKGROUND OF THE INVENTION

Digital data storage devices are utilized for storing information for use by data processing systems including computer systems. One commonly used data storage medium is tape storage, used in tape libraries, well suited for backup operations as well as for providing archival and retrieval operations for vast quantities of information content. In this regard, optical storage is also known for voluminous content storage and retrieval.

Tape libraries are known in the art. An example tape library comprises a semi-cylindrical array of tape cartridge storage slots aligned generally along a fixed radius of curvature. A central cartridge inventory is maintained by a library controller, so that logical requests for a particular drive and cartridge may be translated by the library controller into physical device locations and electromechanical operations. In this prior example, a media loader includes a robotic arm rotating at a focus of the cylindrical segment that is elevated and rotated to a particular cartridge storage slot. A picker-gripper mechanism of the arm then "picks" and "grips" the cartridge stored in the slot and moves the cartridge out of the slot and into a temporary transport slot of the arm. The robotic arm is then commanded to perform a second rotation/elevation operation in order to present the retrieved tape cartridge to a loading tray of the selected tape drive, and the tape drive then loads the cartridge and threads the tape for recording/playback operations, following initial setup and calibration routines conventional with tape drives. The drive may be one of several drives accessible by the robotic arm.

Each tape in the library can be recorded on, and read from, by different tape drives in that library and in other libraries. Interchangeability of tapes written by different tape drive (magnetic recording devices) is difficult because different tape drive heads have different record/playback performance on the same tape, causing different error rates. During a write process, data blocks are written and then read back to check for errors (e.g., CRC check). Bad blocks (e.g., blocks that fail the CRC check) are re-written, wherein a good reader/writer head pair does not re-write many blocks but a weak reader/writer pair re-writes many blocks. These blocks are usually re-written on a different reader/writer pair in a different location on tape to overcome said read errors. As such, if a tape drive includes good reader/writer heads, writing on a tape with the good reader/writer pair does not require rewriting many blocks because the reader/writer can transfer data to/from the tape with high quality. However, when data blocks are successfully written on a tape in a first tape drive, and then during a read process an attempt is made to read those blocks from the tape using a second tape drive with a weak reader, the second tape drive may generate a hard read error. A hard read error is generated if too many bad blocks (i.e., errors) are found during the read process, and the tape drive cannot correct those errors. Once a hard read error is generated, the tape drive cannot continue reading data and customer data may not be recovered.

Multiple manufacturers of the tape drive heads further complicate the ability to insure media (e.g., tape) interchange in removable media devices (e.g., tape drive) with essentially the same error performance. Prior approaches, attempt to solve this problem by tightening the specifications of the magnetic recording devices, or heads, such that all devices perform the same or as close as possible in record/playback operation. By tightening the tolerances so that all heads are built essentially exactly the same, each head provides similar error performance as others. However, because it is unlikely for one manufacturer to make all the heads exactly the same, it is even more unlikely that multiple manufactures can produce heads that are within this tightened specification.

There is, therefore, an unsolved need for improving error performance in removable and interchangeble media devices.

BRIEF SUMMARY OF THE INVENTION

The present invention solves the above problems. In one embodiment the present invention provides a method for writing data with dithering which causes the heads to essentially appear to perform the same way. The dithering is performed by injecting noise into the read-back signal during the write process such that the heads generate the same error rates across all heads in the tape drive. In one example, a target error rate is selected for one or more of the data storage devices. For each data storage device, a dither value is determined for each head in the data storage device. Wherein for each head, using the corresponding dither value for writing data, essentially provides said selected target error for all the heads.

In another embodiment, a method of improving error performance by dithering according to the present invention includes the steps of: determining, on a per channel/head basis, the amount by which to artificially degrade the read-back signal (by e.g. dithering the read signal) during the write process, and to level read-back performance in multiple tape drives. In one example, the method determines data block read performance from a magnetic tape on several heads in several tape drives in one, or more tape libraries across different tape drive manufacturers. The leveling according to the present invention insures interchangeability of the tape media in different tape drives while obtaining essentially the same read/write error performance.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1:
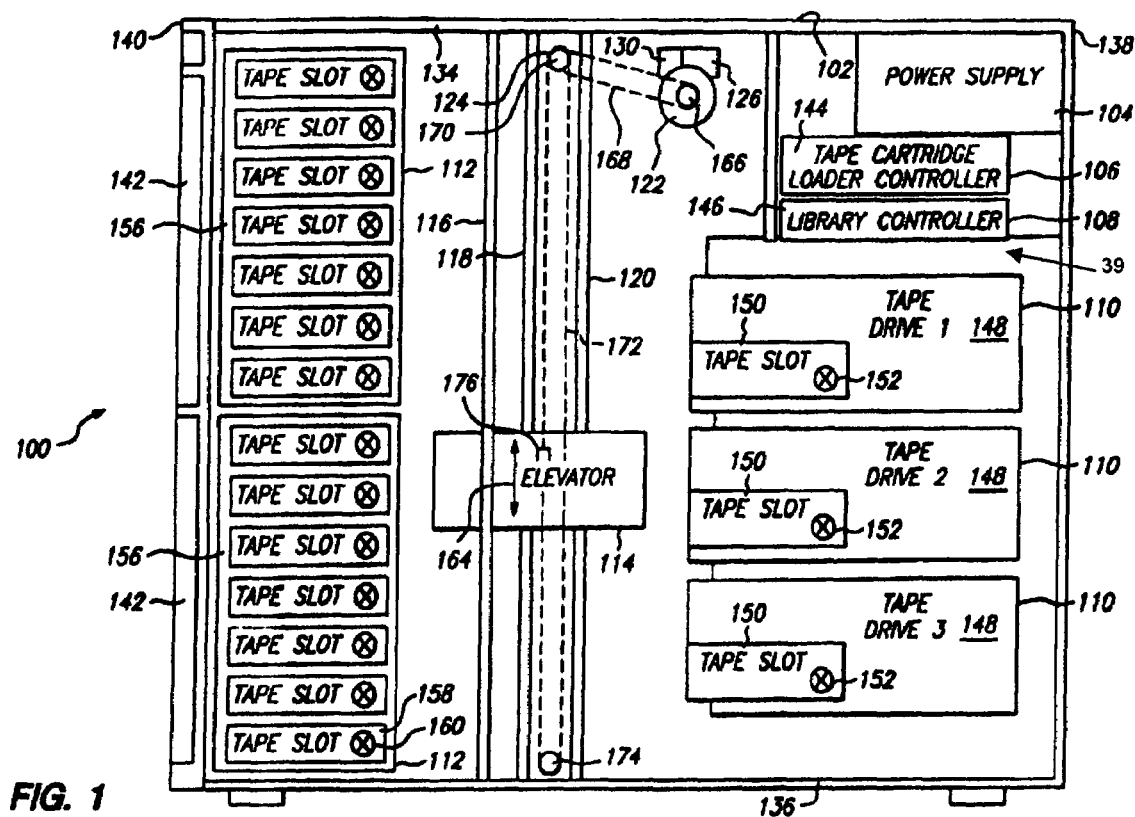
FIG. 1 shows an example block diagram of an embodiment of a tape library in which the present invention can be implemented.

FIG. 1 shows a block diagram of an example storage device with removable media, such as a tape library including multiple tape drives each having several read/write head, for recording data to and reading data from magnetic tapes, in which the present invention can be implemented. FIG. 1 shows a top view of a multi-drive, multi-magazine mass storage and retrieval tape loader unit 100 (e.g., tape library) for tape cartridges in which the present invention can be implemented. The library unit 100 is configured and operates in accordance with principles of the present invention. The library unit 100 includes a housing 102, a power supply 104, a tape cartridge loader controller slot 106, a library controller slot 108, a plurality of tape drive slots 110, a plurality of tape cartridge magazine slots 112, a tape cartridge pass-through elevator 114, at least one tape cartridge elevator guide shaft 116, a drive shaft 118, a rack drive shaft 120, a tape cartridge elevator motor 122, a pulley drive assembly 124, a roller drive shaft motor 126 and, a rack drive shaft motor 130.

The housing 102 may be substantially rectangular or square in cross section and includes a top side wall 134, a bottom side wall 136, a rear wall 138, and a front panel 140. The front panel 140 includes a plurality of access doors 142 pivotally mounted onto the front 140 opposite the tape cartridge magazine slots 112 that permit manual loading and unloading of tape cartridges by an operator into the tape cartridge magazines within the mass storage and retrieval unit 100. The housing 102 may be constructed of any number of conventional materials such as, for example, those utilized in industry standard rack mount cabinets.

The power supply 104 may be positioned in a rear corner of the housing 102 adjacent to the tape cartridge loader controller slot 106 and library controller slot 108. The power supply 104 provides electrical power in a well known manner to the tape cartridge loader controller slot 106, library controller slot 108, the plurality of tape drive slots 110, tape cartridge elevator motor 122, roller drive shaft motor 126, and rack drive shaft motor 130. The power supply 104 is interfaced with these components as well as with an external power source in a well known manner using industry standard cabling and connections.

The unit 100 further includes a controller 39 including a tape cartridge loader controller 144 and a library storage controller 146, a tape cartridge loader controller slot 106 receiving the tape cartridge loader controller 144, and a library controller slot 108 receiving the library controller 146. The tape cartridge loader controller 144 may comprise a standard driver interface unit for receiving digital commands and translating the commands into driving currents, such as step pulses for controlling stepper motors. The library controller 146 may comprise a standard programmable general purpose computer formed on a single plug-in card unit and preferably includes a programmed microprocessor or microcontroller according to the present invention, memory, communication interface, control interface, connectors, etc. The input-output connections between the tape cartridge loader controller 144, the library controller 146 and the other components of the unit 100 may comprise well known industry standard cabling and communication protocols. For example, several implementations use common industry standards such as the I2C bus, RS422 or RS232. Cabling and electrical characteristics including signaling protocols can be generally standardized, the logical message protocols can be either proprietary or standardized as known to those skilled in the art.

Each of the tape drive slots 110 receives a standard tape drive 148 such as, for example, a Quantum DLT2000XT (TM), DLT4000 (TM), or DLT7000 (TM) cartridge tape drive, or equivalent, which has been adapted to fit into the tape drive slots 110. Each tape drive 148 includes a tape cartridge slot 150 and a tape cartridge sensor 152 within the slot 150 which generates a tape cartridge presence signal.

Each of the tape cartridge magazine slots 112 receives a standard tape cartridge magazine 156 such as, for example, a Quantum TK85-M seven cartridge magazine adapted for use in the mass storage and retrieval unit 100. The tape cartridge magazine 156 includes one or more tape cartridge slots 158, a tape cartridge presence flag 160 within each slot 158 which provides an indication of the presence or absence of a tape cartridge, and a release lever (not shown for each slot 158.

The tape cartridge elevator 114 is positioned within the housing 102 between the plurality of tape drive cartridge slots 150 and the plurality of tape cartridge magazine slots 112. In this manner, the tape cartridge elevator 114 is able to load and unload tape cartridges to and from all of the tape drives 148 and tape cartridge magazines 156. The tape cartridge elevator 114 is actuated in the directions indicated by the arrows 164 by the tape cartridge elevator motor 122 and pulley drive assembly 124 under the control of the tape cartridge loader controller 144 and library controller 146. The pulley drive assembly 124 includes a cartridge drive motor pulley 166, a short drive belt 168, an elevator drive pulley 170, a long drive belt 172, and an elevator idler pulley 174. The tape cartridge elevator 114 is slidably mounted upon at least one tape cartridge elevator guide shaft 116 and removably attached to the long drive belt 172 of the pulley drive assembly 124 at a connection point 176. The tape cartridge drive motor pulley 166 is rigidly attached to the output shaft of the tape cartridge drive motor 122. The elevator drive pulley 170 and the elevator idler pulley 174 are rotatably supported by the left and right side walls of the housing 102. The short drive belt 168 is mounted on and between the tape cartridge drive motor pulley 166 and the elevator drive pulley 170 while the long drive belt 172 is mounted on and between the elevator drive pulley 170 and the elevator idler pulley 174.

Under the control of the tape cartridge loader controller 144 and library controller 146, the tape cartridge elevator motor 122 rotates the tape cartridge drive motor pulley 166. Rotation of the tape cartridge drive motor pulley 166 in turn rotates the elevator drive pulley 170. Rotation of the elevator drive pulley 170 in turn causes the long drive belt 172 to move about the elevator drive pulley 170 and the elevator idler pulley 174. As a result of this arrangement, the tape cartridge elevator 114 translates in the direction indicated by the arrows 164 when the tape cartridge elevator motor 122 is rotated under the control of the tape cartridge loader controller 144 and library controller 146 by virtue of the connection 176 with the long drive belt 172.

Figure 2:
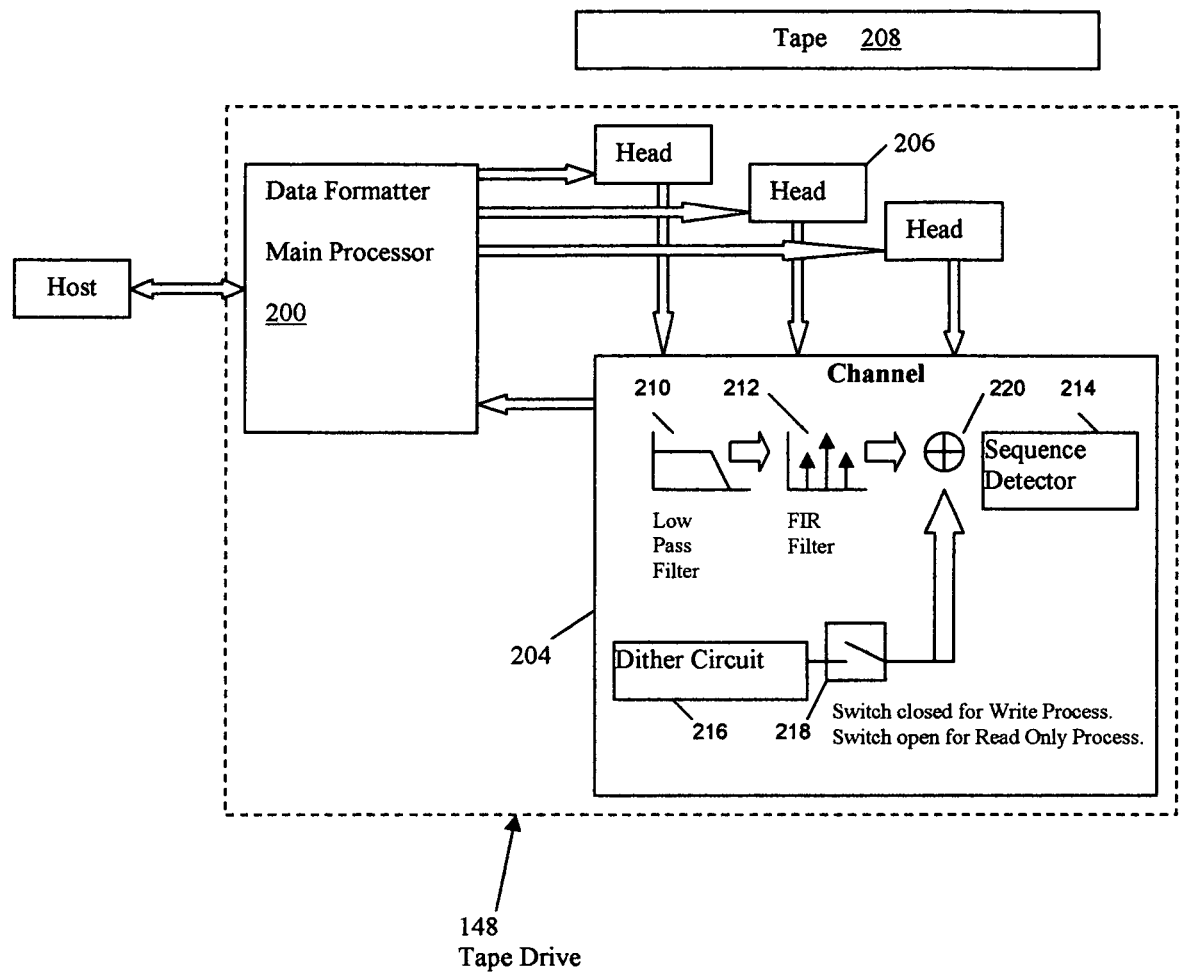
FIG. 2 shows an example block diagram of an embodiment of a tape drive in the library of FIG. 1 in which the present invention can be implemented.

FIG. 2 shows an example block diagram of an embodiment of the architecture of a tape drive 148, according to the present invention. The tape drive 148 includes a Data Formatter/Main Processor 200, read/write channel 204 and multiple heads 206 for writing on recording media (e.g. tape) 208. The data formatter encodes 200, precodes, scrambles, adds a sync mark, preamble, postamble, gap, write equalization, generates the CRC and EDC fields to the customer data. The main processor performs various functions including adding a control field to the customer data. The channel 204 includes a low pass filter 210, an FIR filter 212, sequence detector 214, dither circuit 216 and a switch 218 as shown. The low pass filter 210 removes out of band noise from the read-back signal, the FIR filter 212 shapes the read-back signal to the optimized pulse for the sequence detector 214, and the sequence detector 214 provides a partial response maximum likelihood detection.

During the write process (i.e., write mode), data blocks are written and then read back (i.e., generating a read-back signal) as part of the write process to check for errors (e.g., CRC check) by comparing the read back data to the original data blocks. Bad blocks (e.g., blocks that fail the CRC check) are re-written, wherein a good reader/writer head pair does not re-write many blocks but a weak reader/writer pair re-writes many blocks. These blocks are usually re-written on a different reader/writer pair in a different location on tape to overcome said read errors. Thereafter, when the write process is complete, upon a request for retrieving the written data during a read only process (i.e., read process or read mode) the written blocks are retrieved by reading them from the tape drive.

According to an embodiment of the present invention, in write mode, the switch 218 is closed, wherein the dither circuit 216 injects dithering into the read-back signal via an adder 220 between the FIR filter 212 and the sequence detector 214. Thereafter, during the read process (after the write process) the switch 214 is opened wherein no dither is injected into the read signal. FIG. 2 shows the example block diagram of logic architecture in each tape drive 148 of the library of FIG. 1, providing a dither enhanced write defect re-mapping, or write marginalization, system for improving error performance in the tape library. In this example, dithering is injected into the FIR filter 212 of the read channel for each head 206 in each tape drive 148. In one embodiment, dithering includes injecting into the read-back signal during the write process, a pseudo-random zero mean binary noise signal of a programmable amplitude (this noise is sometimes referred to as white noise because its spectral content is flat similar to white light).

An embodiment of a method of improving error performance (i.e., essentially same number of read/write errors across different tape drives) by dithering according to the present invention includes the steps of: determining, on a per channel/head basis, the amount by which to artificially degrade the read-back signal (by e.g. dithering the read signal) during the write process, to level read-back performance in multiple tape drives. In one example, the method determines data block read performance during write process, from a magnetic tape 208 on several heads 206 on several tape drives 148 in one, or more tape libraries across different tape drive manufacturers. The leveling according to the present invention insures interchangeability of the tape media 208 in different tape drives while obtaining essentially the same read while write error performance.

The leveling is achieved because during the write process marginal blocks are re-written on a different section on the tape 208, wherein with the read-back signal artificially degraded due to dithering the read-back signal, the integrity of the written data is raised. Further, this further insures that all drives produced are substantially more likely to recover the written data. The leveling of read-back performance enhances interchangeability of tapes 208 between drives 148 with different head manufacturers.

The added noise (read-back signal degrading or dithering) is on during write mode, and off during read mode. The noise (i.e., dither) added to the read-back signal of the write process artificially forces more blocks to appear as marginal blocks due to errors (i.e., marginalization), wherein these marginal blocks are re-written. Because more marginal blocks are re-written due to degraded read-back signal, the leveling algorithm provides the benefit of lowering the read only error rate (i.e., regardless of the number of times a block is re-written, a read error only occurs if a block is not written correctly once).

Figure 3:
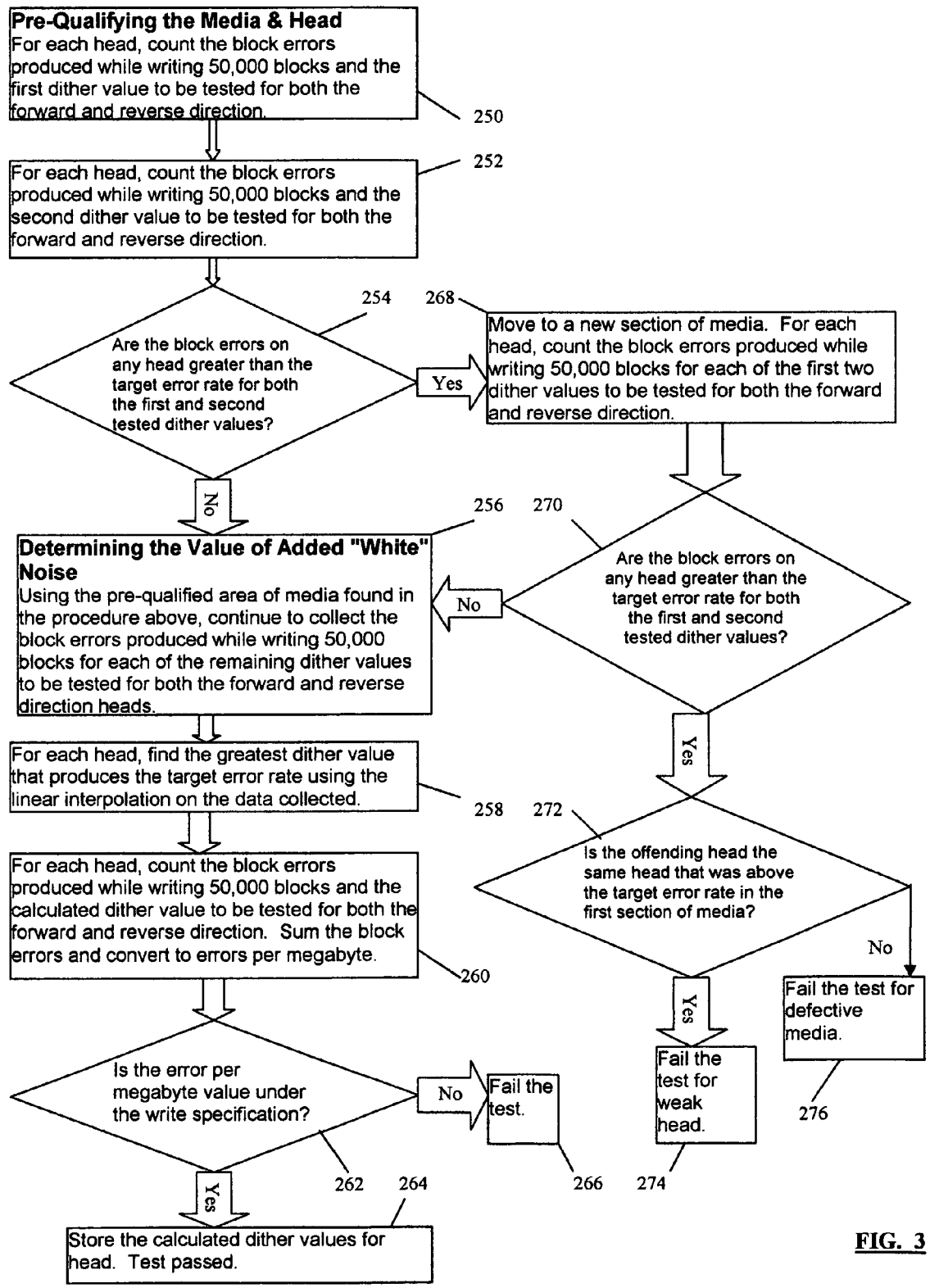
FIG. 3 shows an example flowchart of an embodiment of the steps of the method of the present invention.

Referring to FIG. 3, an example flowchart of the steps of an embodiment of the method of the present invention (dither value calibration) is shown, and described. The method includes a first phase for pre-qualifying the media 208 and heads 206, and a second phase for determining the value of added "white" noise or dithering the read signal during write mode.

The method is performed on one or more tape libraries 100, each having multiple tape drives 148, each tape drive 148 having several heads 206 for reading/writing on a magnetic tape 208 in forward direction and several heads 206 for writing on the tape 208 in reverse direction.

Pre-qualifying an area of the tape media and read/write head, includes the steps of: for each head 206, counting the read-back errors generated while writing 50,000 data blocks on the tape 208 at a dither value to be tested for both the forward and reverse direction (step 250); for each head 206, counting the errors generated while writing 50,000 blocks and a second dither value to be tested for both the forward and reverse direction (step 252); determining if the errors on any head 206 are greater than a target error rate for both the first and second tested dither values (step 254).

Determining desired values for the added "white" noise (dither), by steps including: using the pre-qualified area of media 208 found in the above steps, continuing to collect block read-back errors generated while writing 50,000 blocks for other dither values to be tested for both the forward and reverse direction heads 206 (step 256); for each head 206, finding the greatest dither value that generates the target error rate by interpolating on the error data collected (step 258); for each head 206, counting the read-back block errors generated while writing 50,000 blocks at the calculated dither value tested for both the forward and reverse direction, summing the block errors and converting to errors per e.g. megabyte of data (step 260); determining if the error per megabyte value is below a predetermined write error value (specification) (step 262): if yes, then storing the calculated dither values for each head 206 to be injected (added) when writing data (step 264); otherwise the tape drive fails the test (step 266) and is ultimately discarded.

If in step 254 above, the errors on any head 206 are greater than the target error rate for both the first and second tested dither values, the method further includes the steps of: moving to a new section (area) of the tape media 208, and for each head, writing blocks and counting the block read-back errors generated while writing 50,000 blocks for each of the first two dither values tested for both the forward and reverse directions (step 268); determining if the block errors on any head greater than the target error rate for both the first and second tested dither values (step 270): if not, then going to step 256 above, otherwise, determining if the offending head 206 is the same head 206 that was above the target error rate in the first section of the tape media 208 (step 272); if yes, then the head 206 used for read/write of data to the tape 208 is defective and is failed (step 274); otherwise, the tape 208 is flagged as defective (step 276).

An example application of the above method to reduce unrecoverable (hard) read errors is described below. Dither, or noise, is added in the read-back signal for each head in the channel during the write process, wherein a marginal block is marked as a bad block and re-written (a good block is one that can be read back without a read error all the time, a bad block is one that generates a read error all the time, and a marginal block is one that without added dither may or may not generate a read error).

In this example, data blocks are written with a few different test dither values, and based on the number of read-back errors generated during the write process, a dither value is selected for each head such that the error value for that head most closely matches a target error rate. The target error rate for all heads is selected to be the same value.

First, several test dither values are selected such as e.g. 8, 16, 20, 24, 28, 32 etc., corresponding to an amplitude of the noise added to the read-back signal, depending on the desired amount of noise.

For each test dither value, e.g. 50,000 data blocks are written, and the number of read errors (e.g., ReadCRCErr) for each channel/head (in forward and reverse direction) for the 50,000 blocks are collected. Table 1 below shows the dither value (DV) and read error for 8 heads (e.g., heads 0–7) of a tape drive 148 in the forward direction:

TABLE 1

| | Forward Heads | | | | | | | |
|---|---|---|---|---|---|---|---|---|
| DV/Head | 0 | 1 | 2 | 3 | 4 | 5 | 6 | 7 |
| 8 | 20 | 17 | 18 | 21 | 11 | 15 | 11 | 3 |
| 16 | 31 | 24 | 32 | 23 | 19 | 22 | 16 | 8 |
| 20 | 60 | 46 | 71 | 33 | 25 | 29 | 30 | 19 |
| 24 | 238 | 88 | 215 | 109 | 65 | 89 | 62 | 57 |
| 28 | 1403 | 348 | 1255 | 494 | 314 | 503 | 330 | 395 |
| 32 | 7826 | 1577 | 6871 | 2653 | 1710 | 3081 | 1831 | 2721 |

The values in the above table can be represented as a curve of error rate vs. dither value for each head, wherein some heads have are different read/write capability than other heads. For example, 50,000 data blocks are written with a dither value of 8 for Head1, generating 17 blocks in error upon read-back of those blocks using the same head during the write process. Writing with a dither value of 16 generates 24 blocks in error because a higher dither value represents more noise injected into the read-back signal during the write process (i.e., more marginal blocks).

After collecting the read-back block read error rate for the two lowest dither values, it is determined if read errors for any channel/head is above the target block error rate (T.E.R.) for both dither values. If any channel/head is above the T.E.R. for both dither values, writing is moved to another section of tape and writing process with the first two dither values are retried. If any channel/head is still above the T.E.R. for the two lowest dither values in both sections of tape, the tape drive with the head is failed. In the example Table 2 below, the first two rows (first set of dither values 8 and 16) show read error rates for the heads on the first section of the tape, and the next two rows (second set of dither values 8 and 16) show read error rates for the heads on the second section of the tape. In this example, the T.E.R is set at 50 blocks in error. Because the error rate for channel/Head1 is above 50 for both lowest dither values 8 and 16 in both sections of tape, Head1 is indicated as a weak/bad head (Failure Mode 1).

TABLE 2

| | Failure Mode 1 | | | | | | | |
|---|---|---|---|---|---|---|---|---|
| DV/Head | 0 | 1 | 2 | 3 | 4 | 5 | 6 | 7 |
| 8 | 15 | 55 | 12 | 12 | 15 | 6 | 18 | 16 |
| 16 | 50 | 387 | 29 | 14 | 33 | 25 | 39 | 24 |
| 8 | 13 | 58 | 16 | 18 | 9 | 16 | 12 | 10 |
| 16 | 36 | 388 | 26 | 18 | 25 | 18 | 49 | 16 |

For example, for Head1, with dither values of 8 and 16, error values of 55 and 387 (greater than T.E.R.) are generated, respectively, upon read. Because other dither values for that Head1 are also above T.E.R, the blocks are rewritten another section of the tape using the two dither values (8, 16) with the same Head1 generates 56 and 388 errors (greater than T.E.R), Head1 fails in the second section of the tape as well. Because Head1 failed both sections of tape with the two dither values, Head1 is designated as a bad head (i.e., Head1 is a weak head).

If the read error values generated in writing on a different section of tape are below the T.E.R., the read problems were caused by the tape media, and writing and read error collection for the remaining dither values is continued, as described below. If another channel exceeds the T.E.R. in said new section of tape, then the tape is marked as defective.

In the example Table 3 below, channel/Head1 failed both dither values 8, 16 in the first section of tape because the corresponding read error rates of 55, 387, respectively, are above the T.E.R. of 50 (error rates above T.E.R of 50 are shown in bold). In another write process on a second section of the tape with dither values 8, 16, Head1 passed for dither value 8 because the read-back error rate is 42. As such, the most likely cause of read-back errors during the write process is the bad tape (Failure Mode 2). The test is failed, but a tape change can most likely fix the problem. In the same example head 6 passed for dither values 8, 16 on a first section of the tape, but failed for the same dither values 8, 16 on a different section of the tape. This is another indication that read-back error problems are due to bad tape quality.

TABLE 3

| | Failure Mode 2 | | | | | | | |
|---|---|---|---|---|---|---|---|---|
| DV/Head | 0 | 1 | 2 | 3 | 4 | 5 | 6 | 7 |
| 8 | 15 | 55 | 12 | 12 | 15 | 6 | 18 | 16 |
| 16 | 50 | 387 | 29 | 14 | 33 | 25 | 39 | 24 |
| 8 | 13 | 42 | 16 | 18 | 9 | 16 | 78 | 10 |
| 16 | 36 | 223 | 26 | 18 | 25 | 18 | 93 | 16 |

Referring back to Table 1, upon performing write and read-back tests during write process for different dither values, the read-back error values are used in the steps below to select the proper dither value for each head to meet a substantially uniform read-back error rate for different tapes and heads.

(1) In a first step, Table 1 is reformatted, so that the dither values and corresponding read-back error rates are listed highest to lowest values as shown in Table 4 below (reformatting the table helps select the correct dither level by eliminating the "flat" side of the curve, where the slope of the line is close to zero).

TABLE 4

| | Forward Heads | | | | | | | |
|---|---|---|---|---|---|---|---|---|
| DV/Head | 0 | 1 | 2 | 3 | 4 | 5 | 6 | 7 |
| 32 | 7826 | 1577 | 6871 | 2653 | 1710 | 3018 | 1831 | 2721 |
| 28 | 1403 | 348 | 1255 | 494 | 314 | 503 | 330 | 395 |
| 24 | 238 | 88 | 215 | 109 | 65 | 89 | 62 | 57 |
| 20 | 60 | 46 | 71 | 33 | 25 | 29 | 30 | 19 |
| 16 | 31 | 24 | 32 | 23 | 19 | 22 | 16 | 8 |
| 8 | 20 | 17 | 18 | 21 | 11 | 15 | 11 | 3 |

(2) In a second step, for each channel/head, a first dither value (DV) that generates read-back block errors (ReadCRCErr) less than the T.E.R. is determined, as shown in Table 5 below. In this example, the T.E.R. is 50/50,000 data blocks.

TABLE 5

| | Forward Heads | | | | | | | |
|---|---|---|---|---|---|---|---|---|
| DV/Head | 0 | 1 | 2 | 3 | 4 | 5 | 6 | 7 |
| 32 | 7826 | 1577 | 6871 | 2653 | 1710 | 3081 | 1831 | 2721 |
| 28 | 1403 | 348 | 1255 | 494 | 314 | 503 | 330 | 395 |
| 24 | 238 | 88 | 215 | 109 | 65 | 89 | 62 | 57 |
| 20 | 60 | 46 | 71 | 33 | 25 | 29 | 30 | 19 |
| 16 | 31 | 24 | 32 | 23 | 19 | 22 | 16 | 8 |
| 8 | 20 | 17 | 18 | 21 | 11 | 15 | 11 | 3 |

(3) In a third step, the dither value that produces the read-back block error rate closest to the T.E.R. is determined using interpolation. Determining that dither value includes interpolating between the first dither value that produces a block read-back error rate less than the T.E.R. and the next highest dither value tested (if one of the dither values corresponds to the T.E.R., no interpolation is necessary). The example below shows determining the dither value (DV) for Head0 using the values in Table 5:

(60−TER(50))/(20−DV)=(60−31)/(20−16);
Solve for DV and round down; and
DV=18.

Wherein the dither value of 18 is selected for Head0 as the amount by which to artificially degrade the write signal, to level read-back performance on multiple tapes.

(4) To ensure that a desired write error rate (e.g., one block per Megabyte of data written), another 50,000 blocks are written, read-back as part of the write process, and number of blocks in error per Megabyte are determined, such that if the dither value per head is selected properly, the number of blocks in error per head are essentially the same as T.E.R. As such, the selected dither value for each head is tested by injecting the selected dither value into the read-back-signal in channel during the write process, for each channel/head and read-back error rate (ReadCRCErr) for another e.g. 50,000 data blocks is determined, as shown by example in Table 6 below.

TABLE 6

| | Forward Direction | | | | | | | |
|---|---|---|---|---|---|---|---|---|
| | Head 0 | Head 1 | Head 2 | Head 3 | Head 4 | Head 5 | Head 6 | Head 7 |
| Final CRC Errors | 41 | 38 | 43 | 45 | 37 | 36 | 42 | 36 |

The values in Table 6 are used in the following steps, wherein:

(1) A tape drive is failed if any head in the tape drive exceeds the T.E.R. for the two lowest levels of dither in both sections of tape.

(2) If different channels/heads in a tape drive exceed the T.E.R. in different sections of tape, the tape is failed.

(3) Manufacturing calibration testing that determines the fitness of the tape drive, is failed if the dither value selected for each head generates a write error rate greater than 1 block per Megabyte (MB).

For each tape direction, the block read-back errors are added, and divided by the number of Megabytes. For Table 6 above, the total block errors for the forward direction are: (318 errors)/((50,000 block)*(8 channels/heads)*(4096 bytes per block)*(1 Mbyte))=0.194 errors/MB.

The above process allows obtaining the dither value per head/channel, and also indication of bad channels/heads. For example, if Head7 and Head2 are indicated as bad in the forward direction, and Head2 is indicated as bad in the reverse direction.

Figure 4:
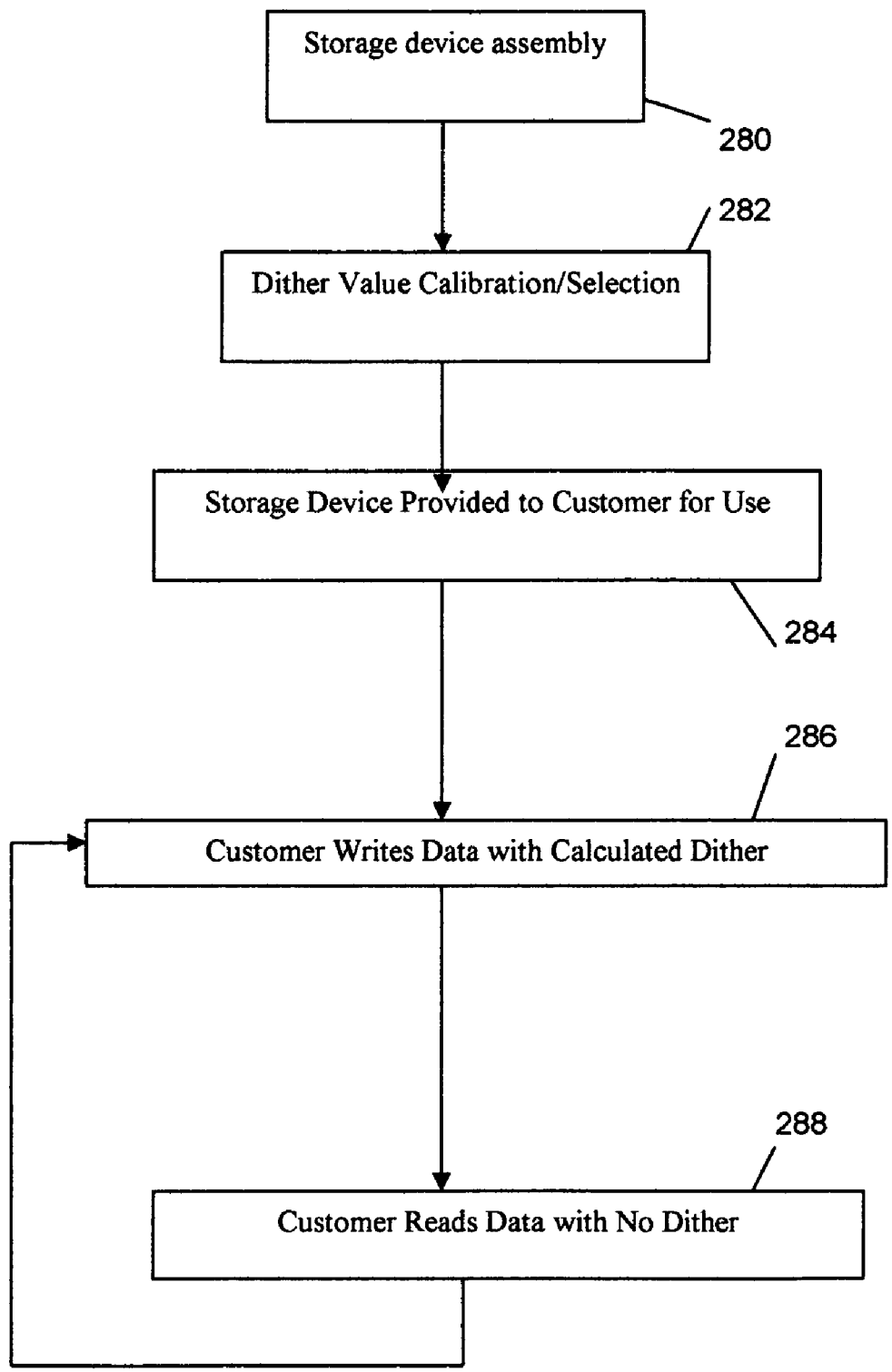
FIG. 4 shows an example flowchart of an embodiment of the overall steps of calibrating storage devices according to the present invention.

As shown in FIG. 4, storage devices such as tape drives 148 are assembled and mounted in tape libraries (step 280), and dither value calibration is performed for the heads in the tape drives according to the above steps (step 282).

In one example, 10 tape drives 148 are utilized, and the steps in FIG. 2 are performed on each tape drive in a round robin manner, wherein data blocks are written one tape in each tape drive, and then cycles into every subsequent tape drive, and the blocks are read and error rate for each tape drive is determined. As such, a tape is written in one tape drive, read and tested in that tape drive and the other 9 tape drives before written again. The generated error rate is processed to determine if the error rate from tape drive to tape drive is greatly increased. Preferably, the error rate per tape in every tape drive is essentially the same, because a high read error rate indicates possibility that written data cannot be recovered from that tape. Application of selected dither values according to the method of the present invention provides less variation in read error rate from tape drive to tape drive.

The selected dither values are programmed into the tape library (e.g., into the tape drive firmware such as channel). The storage devices are provided to customers for use (step 284), wherein user data is written to tapes with the selected dither value for each head (step 286), and data is read without dithering (step 288).

As such, in the embodiment described herein, the present invention provides a method for writing data with dithering which causes the heads to essentially appear to perform the same way. The dithering is performed by injecting noise into the read-back signal during the write process such that the heads generate the same error rates across different tapes. Because error correction is kept limited, when a written data block on a first section of tape is determined to be a bad block, the block is rewritten on a second section of tape. In a tape drive, the heads are interleaved, whereby the written data blocks are interleaved. In a tape drive with 8 forward heads and 8 backward heads, if a head writes a bad block, the block is sent to another head and is re-written in another section of tape. As such, the data blocks are scattered throughout the heads across the tape. According to the present invention, if a tape drive includes a weak head, the chances that a block is re-written is high due to injection of dither/noise in the write signal. The rewrite causes the block to be read better on another head in the tape drive or in another tape drive in the same or a different tape library, thereby leveling performance of the heads.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of improving data playback error performance in data storage devices for storing data on removable data recording media, each data storage device having multiple read/write heads for recording data to the media during a write process and for playing back data from the media during a read process, comprising the steps of:
    (a) selecting a target error rate for recording data during the write process, for one or more of the data storage devices; and
    (b) for each data storage device, determining a dither value for each head in the data storage device, wherein for each head, using the corresponding dither value for the write process essentially provides said selected target error for all the heads.

2. The method of claim 1, wherein in step (b) the write process for each head comprises the steps of:
    writing data blocks to the media; and
    reading said data blocks from the media while introducing dither into the read-back signal as a function of the dither value.

3. The method of claim 2, wherein in step (b) the write process for each head further includes the steps of:
    determining the error rate of the read data;
    comparing the read error rate to the target error rate, and repeating the write process if the read error rate is greater than the target error rate.

4. The method of claim 2, wherein in step (b), determining a dither value for each head further includes the steps of, for each head:
    (1) writing data blocks on a recording media, and reading said data blocks from the media while introducing dither into the read signal as a function of different dither values;
    (2) measuring the error rate generated for each dither value; and
    (3) based on the measured error rates, determining a dither value which generates an error rate at essentially the target error rate for that head.

5. The method of claim 4 wherein in step (b)(3), determining said dither value for a head further includes the steps of:
    selecting a first dither value that generated an error rate below the target error rate;
    selecting a second dither value that generated an error rate above the target error rate; and
    performing interpolation between the first and second dither values, to determine a dither value that generates an error rate at essentially the target error rate for that head.

6. The method of claim 2, wherein step (b) further includes the steps of, before determining said dither value for each head, prequalifying each head and recording media for recording/playback operations, including the steps of, for each head:
    (1) writing data blocks to a first section of the media using a first dither value in a first write process, and measuring the generated error rate for that head,
    (2) writing data blocks to the first section media using a second dither value in a second write process, and measuring the generated error rate for that head,
    (3) if the measured error rate for each dither value is above the target error rate, then repeating steps (1) and (2) for a second section of the media using said first and second dither values, wherein if the measured error rate for the each of the first and second dither values on the second section of the media is above the target error rate, then that head is indicated as a faulty head.

7. The method of claim 6, wherein in step (b)(3), if the measured error rate for one of the first and second dither values on the second section of the media is at or below the target error rate, but the error rate for another head is above the target error rate for both the first and second dither values, then that media is indicated as faulty recording media.

8. The method of claim 2, further including the step of:
    (c) in a write process for each head, writing data blocks with that head while reading the data blocks and introducing dither into the read signal in the head as a function of the determined dither value for the head.

9. The method of claim 8, further comprising the steps of:
    (d) during a read process for each head, reading data with that head without dithering.

10. The method of claim 9, wherein re-writing that data block further includes the steps of re-writing that data block on a different section of the media.

11. The method of claim 9, wherein re-writing that data block further includes the steps of re-writing that data block using a different head.

12. The method of claim 9, wherein re-writing that data block further includes the steps of re-writing that data block on a different section of the media with a different head.

13. The method of claim 8, wherein step (c) further includes the steps of, upon detecting a block error while writing a data block on a section of the media, re-writing that data block.

14. The method of claim 1, wherein the storage device comprises a tape drive including multiple transducer heads, and the recording media comprises magnetic tapes.

15. A method of improving data playback error performance in data storage devices for storing data on removable data recording media, each data storage device having multiple read/write heads for recording data to the media during a write process and for playing back data from the media during a read process, comprising the steps of:
    (a) selecting a target error rate for recording data during the write process, for one or more of the data storage devices; and
    (b) for each data storage device, determining the amount by which to artificially degrade the read signal during the write process for each head in the data storage device to essentially provide said selected target error rate for all the heads.

16. The method of claim 15, wherein step (b) further includes the steps of, determining a dither value for each head in the data storage device, wherein for each head using the corresponding dither value for the write process essentially provides said selected target error rate for all the heads.

17. The method of claim 16, wherein in step (b) the write process for each head comprises the steps of:
    writing data blocks to the media; and
    reading said data blocks from the media while introducing dither into the read-back signal as a function of the dither value.

18. The method of claim 17, wherein in step (b) the write process for each head further includes the steps of:
    determining the error rate of the read data;
    comparing the read error rate to the target error rate, and repeating the write process if the read error rate is greater than the target error rate.

19. The method of claim 17, wherein in step (b), determining a dither value for each head further includes the steps of, for each head:
(1) writing data blocks on a recording media and reading said data blocks from the media while introducing dither into the read signal as a function of different dither values, during the write process;
(2) measuring the error rate generated for each dither value; and
(3) based on the measured error rates, determining a dither value which generates an error rate at essentially the target error rate for that head.

20. The method of claim 19, wherein in step (b)(3), determining said write dither value for a head further includes the steps of:
selecting a first dither value that generated an error rate below the target error rate;
selecting a second dither value that generated an error rate above the target error rate; and
performing interpolation between the first and second dither values, to determine a dither value that generates an error rate at essentially the target error rate for that head.

21. The method of claim 17, wherein step (b) further includes the steps of, before determining said dither value for each head, prequalifying each head and recording media for recording/playback operations, including the steps of, for each head:
(1) writing data blocks to a first section of the media using a first dither value in a first write process, and measuring the generated recording/playback error for that head,
(2) writing data blocks to the first section media using a second dither value in a second write process, and measuring the generated recording/playback error for that head,
(3) if the measured error rate for each dither value is above the target error rate, then repeating step (1) and (2) for a second section of the media using said first and second dither values, wherein if the measured error rate for the each of the first and second dither values on the second section of the media is above the target error rate, then that head is indicated as a faulty head.

22. The method of claim 21, wherein in step (b)(3), if the measured error rate for one of the first and second dither values on the second section of the media is at or below the target error rate, but the error rate for another head is above the target error rate for both the first and second dither values, then that media is indicated as faulty recording media.

23. A data storage device for storing data on removable data recording media, comprising:
multiple read/write heads for recording data to the media during a write process and playing back data from the media during a read process; and
a controller for controlling recording/playback operations with the heads, wherein the controller is configured to artificially degrade the read-back signal for each head during a write process to essentially provide a selected recording target error rate for all the heads.

24. The data storage device of claim 23, wherein to degrade the read signal the controller is further configured to introduce dither into the read-back signal during a write process for each head as a function of a dither value selected for that head, such that all heads provide essentially said selected target error rate.

25. The data storage device of claim 24, wherein the controller is further configured for the write process for each head to write data blocks to the media, and read-back said data blocks from the media while introducing dither into the read-back signal as a function of the selected dither value for the head.

26. The data storage device of claim 25, wherein the controller is further configured to the write process for each head to determine the error rate of the read-back data, and to compare the read error rate to the target error rate, and repeat the write process if the read error rate is greater than the target error rate.

27. The data storage device of claim 25, wherein a dither value for each head is determined by writing data blocks on a recording media and reading back said data blocks while introducing dither into the read-back signal as a function of different dither values during the write process, measuring the error rate generated for each dither value, and based on the measured error rates, determining a write dither value which generates an error rate at essentially the target error rate for that head.

28. The data storage device of claim 25, wherein the controller is configured to read data from the recording media during a read process without dithering the head read signal.

29. The data storage device of claim 28, wherein the controller includes a dither circuit coupled to a read/write signal path in the storage device via a switch, wherein the dither circuit provides a dither signal based on the dither value for each head, such that for a write process the controller closes the switch to inject the dither signal into the read-back signal for each head, and for a read only process the controller opens the switch.

30. The data storage device of claim 23, wherein the controller is configured to detect a block error in writing a data block on a section of the media, and in response, re-write that data block.

31. The data storage device of claim 30, wherein the controller re-writes that data block on a different section of the media.

32. The data storage device of claim 30, wherein the controller re-writes that data block using a different head.

33. The data storage device of claim 30, wherein the controller re-writes that data block on a different section of the media with a different head.

34. The data storage device of claim 23, wherein the data storage device comprises a tape library including a plurality of tape drives including multiple transducer heads, and the recording media comprises magnetic tapes.

* * * * *